United States Patent
Wang

(10) Patent No.: US 8,451,282 B2
(45) Date of Patent: May 28, 2013

(54) METHOD AND APPARATUS FOR ACCESSING IMAGE DATA

(75) Inventor: Shih-Chung Wang, Hsinchu (TW)

(73) Assignee: Mstar Semiconductor, Inc, Hsinchu Hsien (TW)

( * ) Notice: Subject to any disclaimer, the term of this patent is extended or adjusted under 35 U.S.C. 154(b) by 625 days.

(21) Appl. No.: 12/292,238

(22) Filed: Nov. 14, 2008

(65) Prior Publication Data
US 2009/0132771 A1    May 21, 2009

(30) Foreign Application Priority Data
Nov. 16, 2007   (TW) ................................ 96143569 A

(51) Int. Cl.
*G09G 5/36*    (2006.01)
*G06F 13/00*    (2006.01)
*H04L 27/00*    (2006.01)

(52) U.S. Cl.
USPC ............................. 345/558; 711/154; 375/295

(58) Field of Classification Search
None
See application file for complete search history.

(56) References Cited

U.S. PATENT DOCUMENTS

| | | | |
|---|---|---|---|
| 6,777,979 B1 * | 8/2004 | Zhu et al. | 326/41 |
| 6,795,360 B2 * | 9/2004 | Au et al. | 365/221 |
| 7,272,677 B1 * | 9/2007 | Venkata et al. | 710/71 |
| 2004/0008194 A1 * | 1/2004 | Shigeta et al. | 345/204 |
| 2008/0064330 A1 * | 3/2008 | Shigemori | 455/39 |

OTHER PUBLICATIONS

Nov. 1999. "FIFO Architecture, Functions, and Applications" by Texas Instruments.*
Dec. 1999. Datasheet for "CMOS Parallel-to-Serial FIFO" by Integrated Device Technology.*
Nick Sawyer. High-Speed Data Serialization and Deserialization (840 Mb/s LVDS). XILINX, Nov. 7, 2001.*

* cited by examiner

*Primary Examiner* — Kee M Tung
*Assistant Examiner* — Zhengxi Liu
(74) *Attorney, Agent, or Firm* — Rabin & Berdo, P.C.

(57) ABSTRACT

The invention relates to data accessing method and apparatus, and more particularly to data accessing method and apparatus for accessing a first-in first-out (FIFO) buffer compatible with mini-low voltage differential signal (mini-LVDS) transmission interface. The image data accessing apparatus comprises a FIFO memory for storing the image data, and a controller for accessing the FIFO memory in circular manner; wherein the controller writes the image data in pixel-basis and reads the stored image data in channel-basis.

18 Claims, 7 Drawing Sheets

| The number of bit data in an image data \ Output channel number | 3 | 4 | 5 | 6 |
|---|---|---|---|---|
| 6 bit | 3 times | $\frac{9}{4}$ times | $\frac{9}{5}$ times | $\frac{3}{2}$ times |
| 8 bit | 4 times | 3 times | $\frac{12}{5}$ times | 2 times |

FIG. 5

METHOD AND APPARATUS FOR ACCESSING IMAGE DATA

This application claims the benefit of Taiwan application Serial No. 96143569, filed Nov. 16, 2007, the subject matter of which is incorporated herein by reference.

BACKGROUND OF THE INVENTION

1. Field of the Invention

The invention relates in general to a data accessing method and apparatus, and more particularly to a data accessing method and apparatus for accessing a first-in first-out (FIFO) buffer compatible with mini-low voltage differential signal (mini-LVDS) transmission interface.

2. Description of the Related Art

In the technological age which changes with each passing day, one of the tendencies of monitor development is to raise the monitor resolution. Nowadays, data transmission interface, such as mini-low voltage differential signal (mini-LVDS) has been developed to meet the aggregate bandwidth requirement when the resolution of the monitor goes higher.

Mini-LVDS is a high-speed serial transmission interface, which supports data output configurations with 3, 4, 5, or 6 output channels to simultaneously output data stored in 3, 4, 5, or 6 memory blocks and supports a data input configuration with 3 input channels. Conventionally, a buffer with adjustable memory step size of 3, 4, 5 or 6 memory blocks is applied in mini-LVDS interface. In other words, after a read operation performed according to a present address, the address pointed to by the read pointer is changed by a step, the size of which is adjustable from 3 to 6 memory blocks. Therefore, the buffer is capable of flexibly supporting the data output configurations with 3 to 6 output channels.

Conventionally, the amount of memory blocks of the buffer is set to the least common multiple (LCM) of the possible step sizes of the read and the write pointers, that is, the LCM of the numbers 3, 4, 5, and 6. Therefore, the amount of memory blocks of the buffer is divisible by the step sizes of 3 to 6. In other words, the amount of memory blocks of the buffer is at least, a multiple of 60, which is the LCM of 3, 4, 5, and 6. However, the cost of the conventional buffer is raised due to the amount of memory blocks of the buffer. Thus, how to reduce the amount of memory blocks of the buffer applied in the mini-LVDS interface is one of the efforts the industries are making.

SUMMARY OF THE INVENTION

The invention is directed to a data accessing method and apparatus, which are advantageously capable of reducing the amount of memory blocks of the buffer applied in a mini-low voltage differential signal (mini-LVDS) interface.

According to an aspect of the present invention, an apparatus for accessing image data is provided. The apparatus comprises a FIFO memory for storing the image data; and a controller for accessing the FIFO memory in circular manner; wherein the controller writes the image data in pixel-basis and reads the stored image data in channel-basis.

Additionally, the controller writes the image data into the FIFO memory according to a write pointer, reads the stored image data out of the FIFO memory according to a first order read pointer and a second order read pointer.

Additionally, the controller writes image data of a pixel into the FIFO memory within one clock cycle of a write clock signal, and reads M bit-pair data of the stored image data from the FIFO memory to M output channels, respectively, within one clock cycle of a read clock signal; wherein the number M is a positive integer.

According to another aspect of the present invention, a method for accessing image data is provided. The method comprises the steps of: writing the image data into a FIFO memory in pixel-basis; and reading stored image data out of the FIFO memory in channel-basis; wherein the FIFO memory is accessed in circular manner.

Additionally, the method further comprises the steps of: providing a write pointer upon which the image data are written into the FIFO memory; and providing a first order read pointer and a second order read pointer upon which the stored image data are read out of the FIFO memory.

Additionally, the image data of a pixel are written into the FIFO memory within one clock cycle of a write clock signal. M bit-pair data of the stored image data are read from the FIFO memory to M output channels, respectively, within one clock cycle of a read clock signal, where the number M is a positive integer.

The invention will become apparent from the following detailed description of the preferred but non-limiting embodiments. The following description is made with reference to the accompanying drawings.

BRIEF DESCRIPTION OF THE DRAWINGS

FIG. 5 is a table relating the frequencies ratio of the write and the read clock signals Wr_Clk and Rd_Clk to the numbers of bits included in an image datum and the numbers of output channels.

DETAILED DESCRIPTION OF THE INVENTION

The embodiment of the invention provides a mini-low voltage differential signal (mini-LVDS) interface unit, which is capable of using a first in first out (FIFO) buffer with reduced amount of memory blocks to support all of data output configurations of the mini-LVDS interface.

Figure 1:
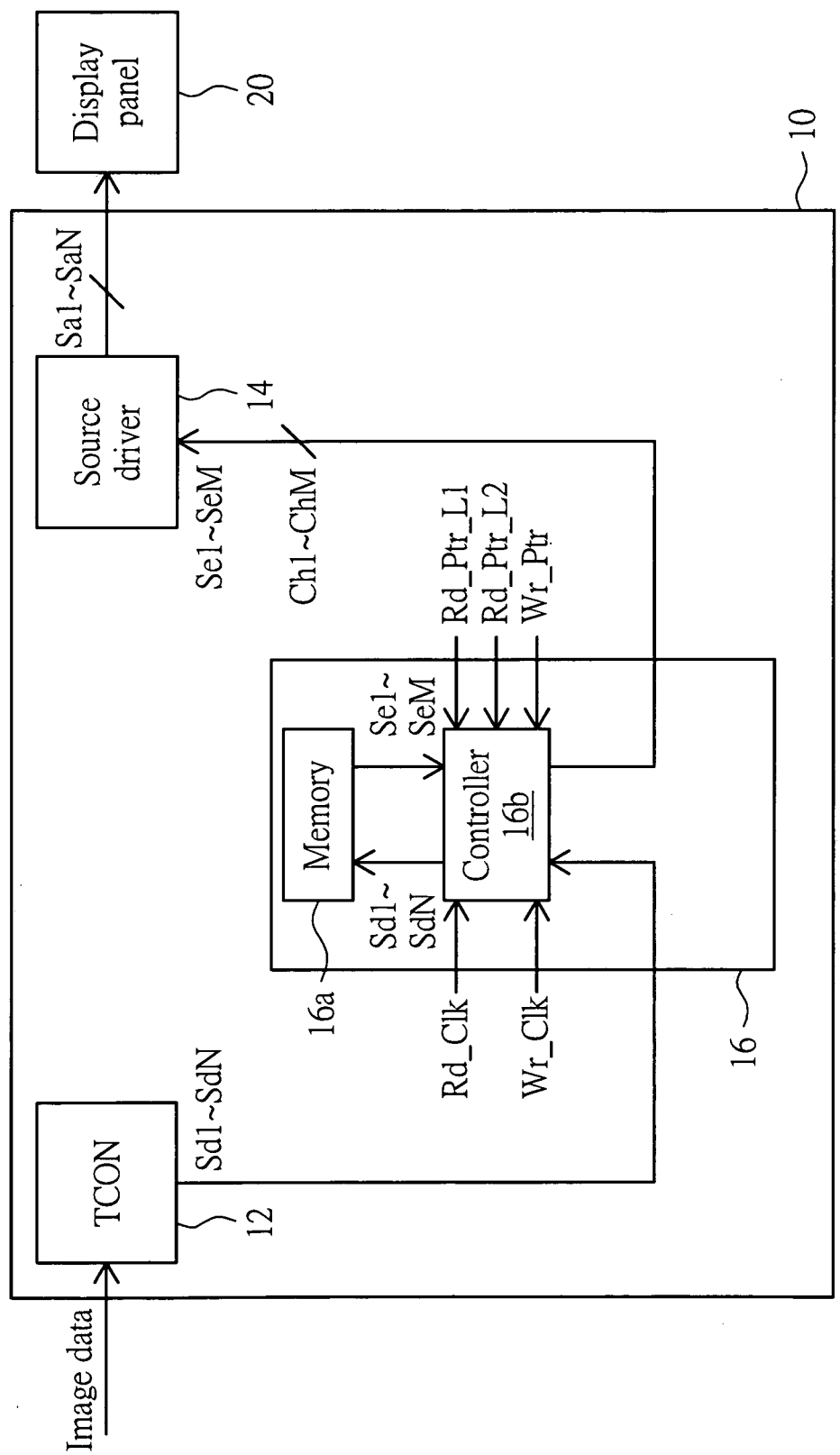
FIG. 1 is a block diagram of a driving circuit of a display panel according to an embodiment of the invention.

Referring to FIG. 1, a block diagram of a driving circuit of a display panel according to an embodiment of the invention is shown. The mini-LVDS interface unit 16 is applied in a driving circuit 10 of a display system (not shown) for driving a display panel 20. The driving circuit 10 receives image data Sd1 to SdN from an image data source and outputs the corresponding analog data Sa1 to SaN to the display panel 20 for displaying a corresponding image. N is a natural number greater than 1.

The display panel 20 includes a pixel array (not shown), each pixel of which includes N sub-pixels. The image data Sd1 to SdN respectively correspond to the analog data Sa1 to SaN, which are for respectively driving N sub-pixels of a pixel in the display panel 20 to display a corresponding pixel image. In the present embodiment of the invention, an example is made with N=3, wherein a pixel has three sub-pixels: red, green, and blue sub-pixels, the analog data Sa1 to Sa3 are for respectively driving the red, the green, and the blue sub-pixels, and each of the image data Sd1 to Sd3 respectively includes 8-bit data.

The driving circuit 10 further includes timing controller (TCON) 12 and a number of source drivers 14. The TCON 12 receives image data from an image data source and outputs as the image data Sd1 to Sd3 to the mini-LVDS interface unit 16. The mini-LVDS interface unit 16 outputs M image data Se1 to SeM to the source drivers 14 through M data channels Ch1 to ChM respectively. M is the number of output data channels supported by the mini-LVDS interface. According to the mini-LVDS interface standard, 3, 4, 5, or 6 output channels are supported. In the present embodiment of the invention, M is taken to be 6 for example. In a preferred embodiment of the present invention, the mini-LVDS interface unit 16 is integrated within the TCON 12.

The mini-LVDS interface unit 16 includes a memory 16a and a controller 16b. The memory 16a is programmed to define a FIFO buffer for buffering data transmission between the TCON 12 and the source drivers 14. Please refer to FIG. 2, which shows a schematic illustration of a FIFO buffer according to the embodiment of the invention. In the present embodiment, the FIFO buffer is defined as a FIFO buffer with approximately circular structure, which means the FIFO buffer is accessed in circular manner. The FIFO buffer includes a number of memory blocks, and each of the memory blocks includes a number of memory units for storing data of a number of bits. In the present embodiment, the circular FIFO buffer is exemplified by 12 memory blocks MU0 to MU11, and each of the memory blocks MU0 to MU11 includes 8 memory units so as to store 8-bit data.

The data access operation of the FIFO buffer is controlled by the controller 16b. In the present embodiment, the controller 16b accesses the FIFO buffer and performs transmission operation between the TCON 12 and the source drivers 14 in response to a read pointer Wr_Ptr, a first order write pointer Rd_Ptr_L1, a second order write pointer Rd_Ptr_L2, a write clock signal Wr_Clk, and a read clock signal Rd_Clk. In one embodiment, the write pointer Wr_Ptr, the first order read pointer Rd_Ptr_L1, and the second order read pointer Rd_Ptr_L2 are provided by the TCON 12. In another embodiment, the write pointer Wr_Ptr, the first order read pointer Rd_Ptr_L1, and the second order read pointer Rd_Ptr_L2 are generated by the controller 16b.

The write pointer Wr_Ptr is set to point to the current write address of the FIFO buffer. In a write clock cycle of the write clock signal Wr_Clk, the controller 16b writes the image data Sd1 to Sd3 into 3(=N) corresponding memory blocks of the FIFO buffer at the same time. For example, the write pointer Wr_Ptr is set to point to the memory block MU0 of the FIFO buffer, and the controller 16 writes the image data Sd1 into the memory block MU0 and writes the image data Sd2 and Sd3 into the 2(=N−1) memory blocks after the memory block MU0, that is, the memory blocks MU1 and MU2, respectively.

Normally, the controller respectively writes the 3 (=N) image data Sd1 to Sd3 into the memory block pointed to by the write pointer Wr_Ptr and the 2 (=N−1) memory blocks after the memory block pointed to by the write pointer Wr_Ptr. However, when the difference between the address pointed to by the write pointer Wr_Ptr and the address corresponding to the last memory block of the FIFO buffer is a number X, and the number X+1 is smaller than the number 3(=N), the controller 16b writes the first X+1 data of the image data Sd1 to Sd3 into the last X+1 memory blocks of the FIFO buffer, and writes the last 3−(X+1) (=N−(x+1)) data of the image data Sd1 to Sd3 into the first 3−(X+1) memory blocks of the FIFO buffer. For example, when the write pointer Wr_Ptr points to the memory block MU10 of the FIFO buffer, the number X satisfied:

$$x=11-10=1$$

Therefore, the controller 16b writes the first two data of the image data Sd1 to Sd3, that is, the image data Sd1 and Sd2, respectively to the memory blocks MU10 and MU11, and writes the last image data of the image data Sd1 to Sd3, that is, the image data Sd3, to the memory block MU0.

In the present embodiment, the controller 16b performs modulo addition operation of the write address pointed to by the write pointer Wr_Ptr in the present clock cycle of the write clock signal Wr_Clk and the number 3 (=N) with respect to the amount of the memory blocks of the FIFO buffer, so as to obtain the next write address pointed to by the next write pointer Wr_Ptr in the next clock cycle of the write clock signal Wr_Clk. For example, when memory block MU10 is pointed to by the write pointer Wr_Ptr in the present write clock cycle, the controller 16b sets the memory block pointed to by the write pointer Wr_Ptr in the next write clock cycle to be the memory block MU1 ([10+3 modulo 12]=1). Therefore, the next set of image data Sd1 to Sd3 are respectively written into the memory blocks MU1 to MU3 in the next write clock cycle.

Figure 2:
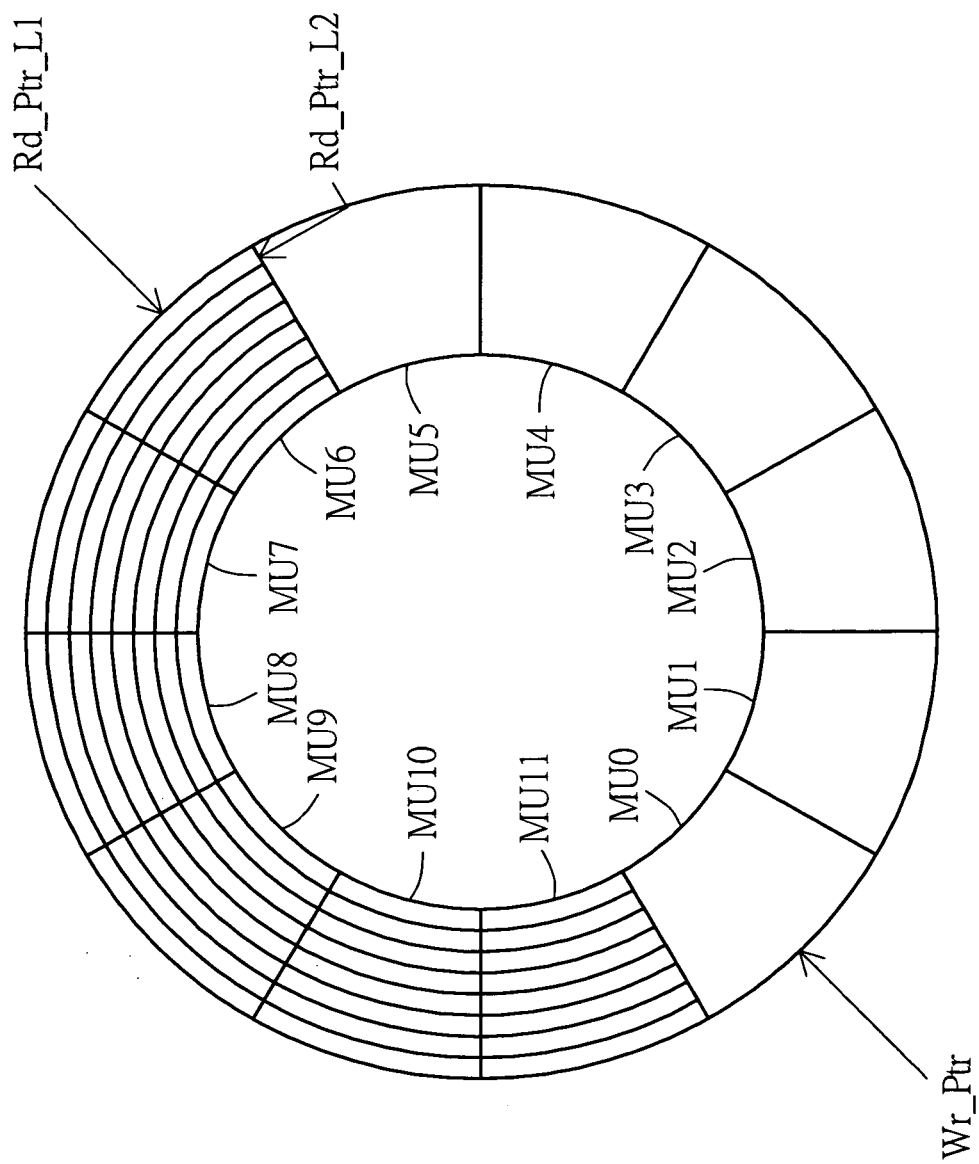
FIG. 2 is a schematic illustration of a FIFO buffer according to the embodiment of the invention.
Figure 3:
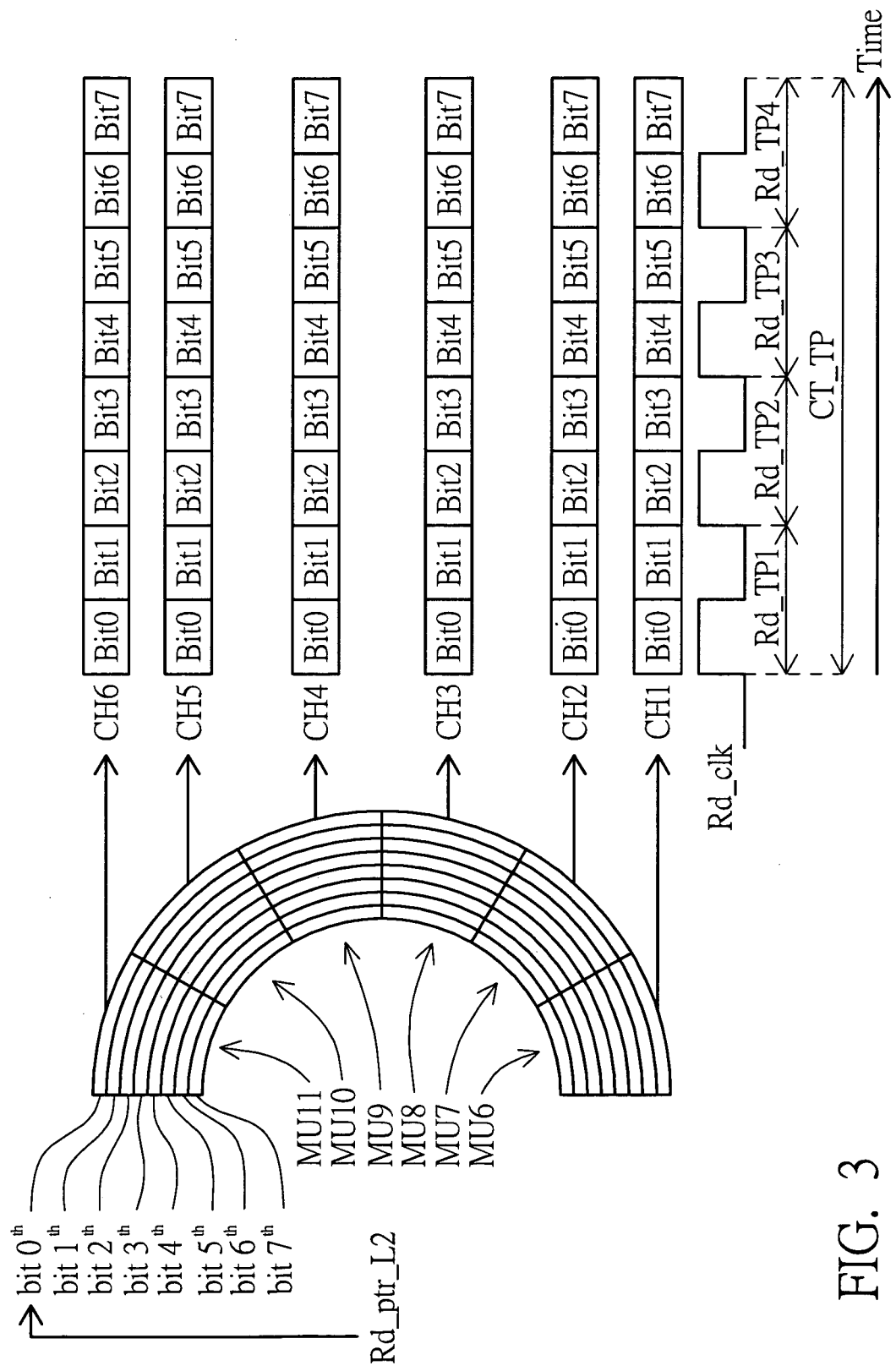
FIG. 3 is a schematic illustration of the read operation of the FIFO buffer shown in the FIG. 2.

Please refer to FIG. 3, which shows a schematic illustration of the read operation of the FIFO buffer shown in the FIG. 2. The controller 16b uses the first order read pointer Rd_Ptr_L1, which is set to point a read address of the FIFO buffer, to read data stored in the FIFO buffer. In a time period CT_TP, the controller 16b reads 6 (=M) image data stored in the corresponding 6 memory blocks of the FIFO buffer as the image data Se1 to Se6 according to the read address pointed by the first order read pointer Rd_Ptr_L1.

In read operation of the FIFO buffer, the second order read pointer Rd_Ptr_L2 is set to point to one address of the 8 memory units in the 6 memory blocks. In 4 read clock cycles Rd_TP1 to Rd_TP4 of the read clock signal Rd_Clk, the controller 16b respectively outputs the $0^{th}$ and the $1^{st}$ bit data, the $2^{nd}$ and the $3^{rd}$ bit data, the $4^{th}$ and the $5^{th}$, and the $6^{th}$ and the $7^{th}$ bit data of the image data Se1 to Se6. That is 6(=M) bit-pair data are read from 6(=M) memory blocks to 6(=M) output channels in a clock cycle of the read clock signal Rd_Clk. The read clock cycles Rd_TP1 to Rd_TP4 are included in the time period CT_TP.

For example, in the time period CT_TP, first order read pointer Rd_Ptr_L1 is set to point to the memory block MU6 of the FIFO buffer. Then image data stored in the memory block MU6 and the 5 (=N−1) memory blocks after the memory block MU6, i.e. the memory blocks MU7 to MU11, are read out as the image data Se1 to Se6 respectively by the controller 16b. In the read clock cycle Rd_TP1, the second order read pointer Rd_Ptr_L2 is set to point to the $0^{th}$ memory unit of the memory blocks MU6 to MU11, meanwhile, the controller 16b obtains the $0^{th}$ and the $1^{st}$ bit data stored in the $0^{th}$ and the $1^{st}$ memory units of the memory blocks MU6 to MU11 and outputs the $0^{th}$ and the $1^{st}$ bit data of the memory blocks MU6 to MU11 respectively through the channels Ch1 to Ch6.

In the read clock cycles Rd_TP2, Rd_TP3, and Rd_TP4, the second order read pointer Rd_Ptr_L2 is set to point to the $2^{nd}$, the $4^{th}$, and the $6^{th}$ memory units of the memory blocks MU6 to MU11 respectively. Therefore, in the read clock cycles Rd_TP2 to Rd_TP4, the $2^{nd}$ and $3^{rd}$ bit data, the $4^{th}$ and $5^{th}$ bit data, and the $6^{th}$ and $7^{th}$ bit data of the memory blocks MU6 to MU11 are respectively read by the controller 16b and those bit data of the memory blocks MU6 to MU11 are respectively outputted through the channels Ch1 to Ch6. Consequently, the image data Se1 to SeM are outputted by the controller 16b in the time period CT_TP.

Normally, the controller 16b reads the 6 (=M) image data Se1 to Se6 stored in the memory block pointed to by the first order read pointer Rd_Ptr_L1 and the M−1 memory blocks after the memory block pointed to by the first order read pointer Rd_Ptr_L1. However, when the difference between the read address pointed to by the first order read pointer Rd_Ptr_L1 and the address corresponding to the last memory block of the FIFO buffer is a number Y, and the number Y+1 is smaller than the number 6 (=M), the controller 16b reads the data of the last Y+1 memory blocks to obtain the first Y+1 data of the data Se1 to Se6, and reads the data of the first 6−(Y+1) (=M−(Y+1)) memory blocks to obtain the last 6−(Y+1) data of the data Se1 to Se6. For example, when the first order read pointer Rd_Ptr_L1 is pointing to the memory block MU9, the number Y satisfied:

$$Y=11-9=2$$

Therefore, the controller 16b reads the data stored in the memory blocks MU9 to MU11 to obtain the image data Se1 to Se3, and reads the data stored in the memory blocks MU0 to MU2 to obtain the image data Se4 to Se6.

Figure 4:
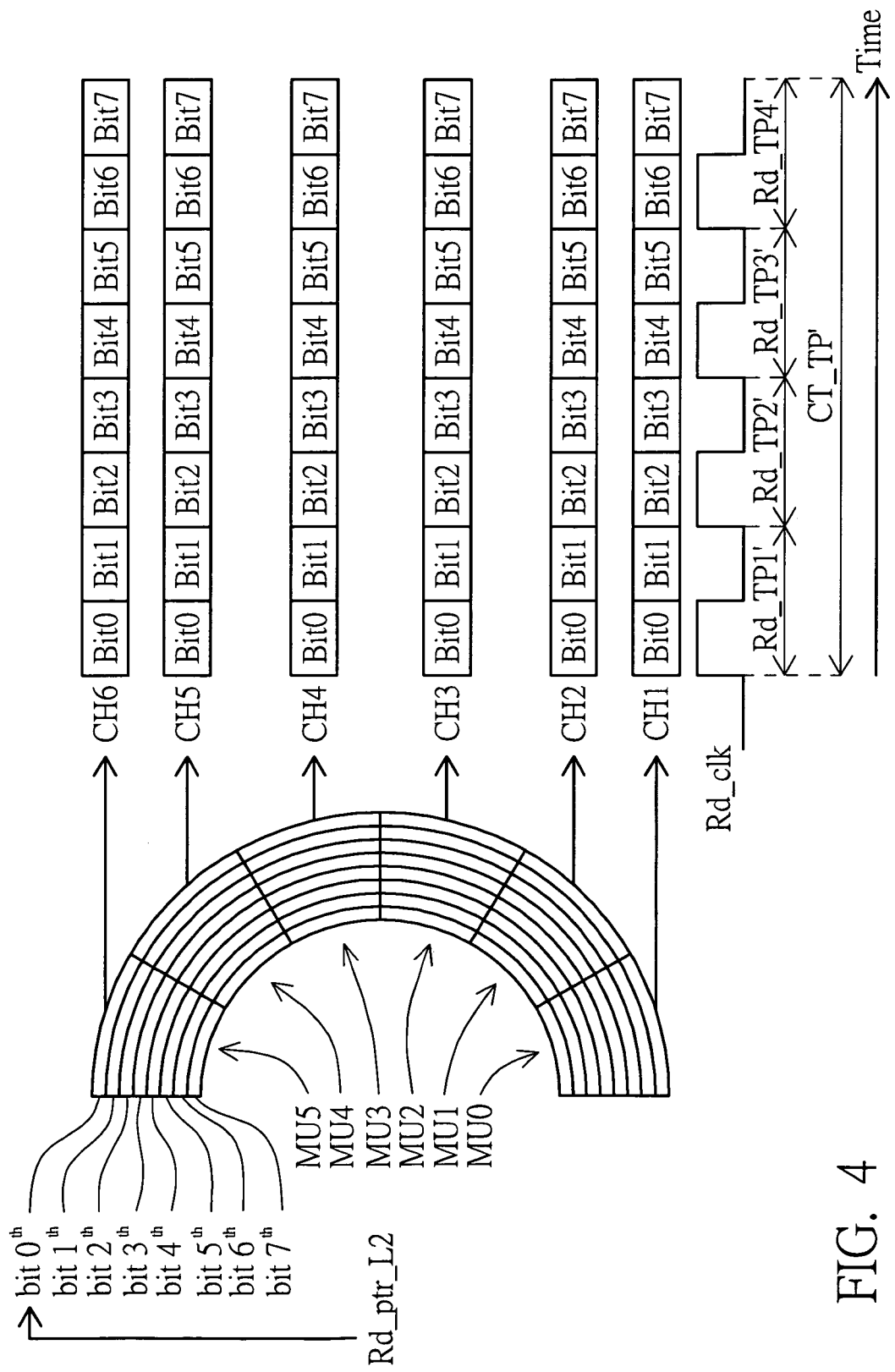
FIG. 4 is a schematic illustration of the read operation of the FIFO buffer shown in the FIG. 2 in the previous time period.

For the next time period CT_TP', the controller 16b performs modulo addition operation of the address pointed to by the first order read pointer Rd_Ptr_L1 in the present time period CT_TP and the number 6 (=M) with respect to the amount of the memory blocks of the FIFO buffer, so as to obtain the next address pointed by the next first order read pointer Rd_Ptr_L1 in the next time period CT_TP'. For example, when the memory block MU6 is pointed to by the first order read pointer Rd_Ptr_L1 in the present time period CT_TP, the controller 16b sets the memory block pointed to by the first order read pointer Rd_Ptr_L1 in the next time period CT_TP' to be the memory block MU0 (6+6 modulo 12). Therefore, the data stored in the memory blocks MU0 to MU5 are read and outputted as the next set of image data Se1 to Se6. As illustrated in FIG. 4, the controller 16b outputs the image data Se1 to Se6 to the source drivers 14 through the data channels Ch1 to Ch6, respectively.

In present embodiment, the controller 16b uses one memory block as the step size when performing the write operation and the read operation. N steps and M steps are respectively moved within a write clock cycle and a time period CT_TP, so as to perform the data write and read operations of the FIFO buffer. Therefore, the amount of the memory blocks of the FIFO buffer needs not to be the least common multiple (LCM) of the numbers N and M and the amount of the memory blocks of the FIFO buffer still can be divisible by the step size (one memory block). Consequently, the amount of the memory blocks of the FIFO buffer can be set to be smaller than the LCM of the numbers N and M. Although the step size of the write operation and the read operation are set to one memory block as an example in the present embodiment, the step size of the write operation and the read operation can also be set to any common factor of the numbers N and M.

The amount of the memory blocks of the FIFO buffer is determined by the digital latency between the write and the read clock signals Wr_Clk and Rd_Clk. For example, the latency between the write enable signal (not shown) and the read enable signal (not shown) of the FIFO buffer is assumed to be one of the write clock cycle of the write clock signal Wr_Clk. The amount of the memory blocks of the FIFO buffer should be greater than or equal to the sum of two times of the amount of memory blocks written in one write operation with the amount of memory blocks read in one read operation. In the present embodiment, the amount of the memory blocks of the FIFO buffer should be greater than or equal to 12 (=3×2+6) memory blocks. Therefore, the amount of the memory blocks of the FIFO buffer in the present embodiment of the invention can be effective reduced in comparison to the amount of the memory blocks of the conventional FIFO buffer, which should be greater than or equal to the LCM of the number 3 to 6, that is, a multiple of the number 60.

The data read speed and the write speed of the FIFO buffer are preferable the same, so as to avoid data access error due to data overflow and data underflow. The write operation that the controller 16b performs on the FIFO buffer is in pixel-basis. That is 3 image data of a pixel (a pixel has red, green, and blue image data), each of which is 8-bit data, are written in the FIFO buffer in a write clock cycle. In other words, the data write speed of the FIFO buffer is 24-bit data per write clock cycle.

The read operation that the controller 16b performs on the FIFO buffer is in channel-basis. That is 6(=M) data, each of which includes 2-bit (bit-pair) data, are read out of the FIFO buffer to 6(=M) output channels, respectively, in every read clock cycle. In other words, the data read speed of the FIFO buffer is 12-bit data per read clock cycle. Therefore, the frequency of the read clock signal Rd_Clk is preferably set to twice of the frequency of the write clock signal Wr_Clk. Because the image data of a pixel are written into the FIFO buffer in a write clock cycle and M bit-pair data are read out of the FIFO buffer in a read clock cycle, the frequency of the read clock signal Rd_Clk is substantially T times of the frequency of the write clock signal Wr_Clk, where the number T is a half of a bit amount of the image data of a pixel divided by M.

Though the case that the mini-LVDS unit 16 supports the data accessing operation with 6 output channels, the mini-LVDS unit 16 is not limited thereto and can support data accessing operation with 3 to 5 output channels or data accessing operation with 3 to 6 output channels and each of the image data Sd1 to SdN includes 6-bit data. The accessing operation mentioned above can be easily obtained based on the accessing operation with 6 output channels, and each of the image data Sd1 to SdN includes 8-bit data, only the frequencies of the write and the read clock signals should be adjusted so as to keep the data read and write speeds of the FIFO buffer substantially the same.

Referring to FIG. 5, a table corresponding the frequencies ratio of the write and the read clock signals Wr_Clk and Rd_Clk to the numbers of bit data included in an image data and the numbers of output channels is shown. For example, when the number of bits included in each of the image data Sd1 to SdN (N=3) is 8, the data write speed of the FIFO buffer is 24-bit data per write clock cycle. If the FIFO buffer supports the data read operation with 3, 4, or 5 output channels, the data read speed of the FIFO buffer is 6, 8, or 10-bit data per read clock cycle. Consequently, the frequency of the read clock signal Rd_Clk should be set to 4, 3, or 12/5 times of the frequency of the write clock signal Wr_Clk so as to keep the data write and data read speeds of the FIFO buffer substantially the same.

For another example, when the number of bits included in each of the image data Sd1 to SdN (N=3) is 6, the data write speed of the FIFO buffer is 18-bit data per write clock cycle. If the FIFO buffer supports the data read operation with 3, 4, 5, or 6 output channels, the data read speed of the FIFO buffer is 6, 8, 10, or 12-bit data per read clock cycle. Consequently, the frequency of the read clock signal Rd_Clk should be set to 3, 9/4 (=18/8), 9/5 (=18/10), or 3/2 (=18/12) times of the frequency of the write clock signal Wr_Clk so as to keep the data write and data read speeds of the FIFO buffer substantially the same.

Figure 6:
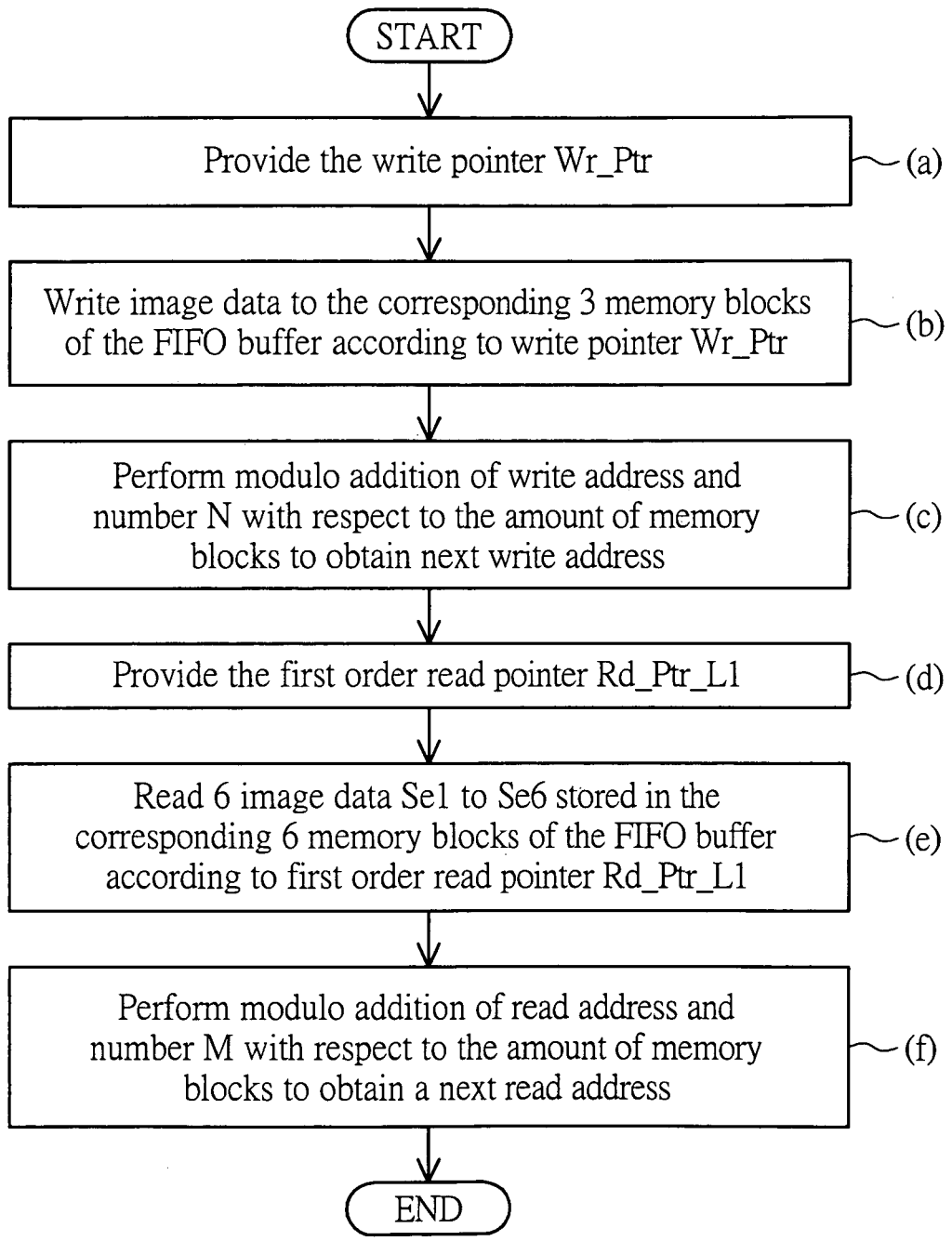
FIG. 6 is a flow charge of the data accessing method according to the present embodiment of the invention.

Please refer to FIG. 6, which shows a flow chart of the data accessing method according to the present embodiment of the invention. The data accessing method of the present embodiment of the invention is applied in the FIFO buffer of mini-LVDS unit and the data accessing method includes the next steps. Firstly, as shown in step (a), the controller 16*b* provides the write pointer Wr_Ptr, which points to a write address of the FIFO buffer. For example, the write pointer Wr_Ptr points to the memory block MU0.

Next, as shown in step (b), under the control of the write clock signal Wr_Clk, the controller 16*b* writes the image data Sd1 to SdN into respective N memory blocks of the FIFO buffer according to the write address pointed to by the write pointer Wr_Ptr. The number N is, for example, equal to 3 and the image data Sd1 to Sd3 are respectively written to the memory blocks MU0 to MU2 when the write pointer Wr_Ptr points to the memory block MU0. When the difference between the write address pointed by the write pointer Wr_Ptr and the address corresponding to the last memory block of the FIFO buffer is a number X, and the number X+1 is smaller than the number 3 (=N), the first X+1 data of the image data Sd1 to Sd3 are written to the last X+1 memory blocks of the FIFO buffer, and the last N−(x+1) (=3−(x+1)) are written to the first 3−(x+1) memory blocks of the FIFO buffer.

Then, as shown in step (c), the controller 16*b* performs modulo addition of the write address pointed by the write pointer Wr_Ptr in the present write clock cycle of the write clock signal Wr_Clk and the number 3 (=N) with respect to the amount of the memory blocks of the FIFO buffer, so as to obtain the next write address pointed by the next write pointer Wr_Ptr in the next write clock cycle of the write clock signal Wr_Clk.

Then step (d) is performed. The controller 16*b* provides a first order read pointer Rd_Ptr_L1, which is set to point to a read address of the FIFO buffer. For example, the first order read pointer Rd_Ptr_L1 points to the memory block MU6.

After that, as indicated in step (e), under the control of the read clock signal Rd_Clk, the controller 16*b* outputs M data stored in the M memory blocks of the FIFO buffer through the respective M output channels according to the read address pointed by the first order read pointer Rd_Ptr_L1. The number M is, for example, equal to 6. The M memory blocks are, for example, the memory blocks MU6 to MU11 when the first order read pointer Rd_Ptr_L1 points to the memory block MU6. When the difference between the read address pointed by the first order read pointer Rd_Ptr_L1 and the address corresponding to the last memory block of the FIFO buffer is a number Y, and the number Y+1 is smaller than the number 6 (=M), the controller 16*b* reads the data of the last Y+1 memory blocks to obtain the first Y+1 data of the data Se1 to Se6, and reads the data of the first N−(Y+1) (=6−(Y+1)) memory blocks to obtain the last 6−(Y+1) data of the data Se1 to Se6.

After that, step (f) is performed. The controller 16*b* performs modulo addition operation to the read address pointed by the first order read pointer Rd_Ptr_L1 in the present read clock cycle of the read clock signal Rd_Clk and the number 6 (=M) with respect to the amount of the memory blocks of the FIFO buffer, so as to obtain the next read address pointed by the next first order read pointer Rd_Ptr_L1 in the next read operation.

Figure 7:
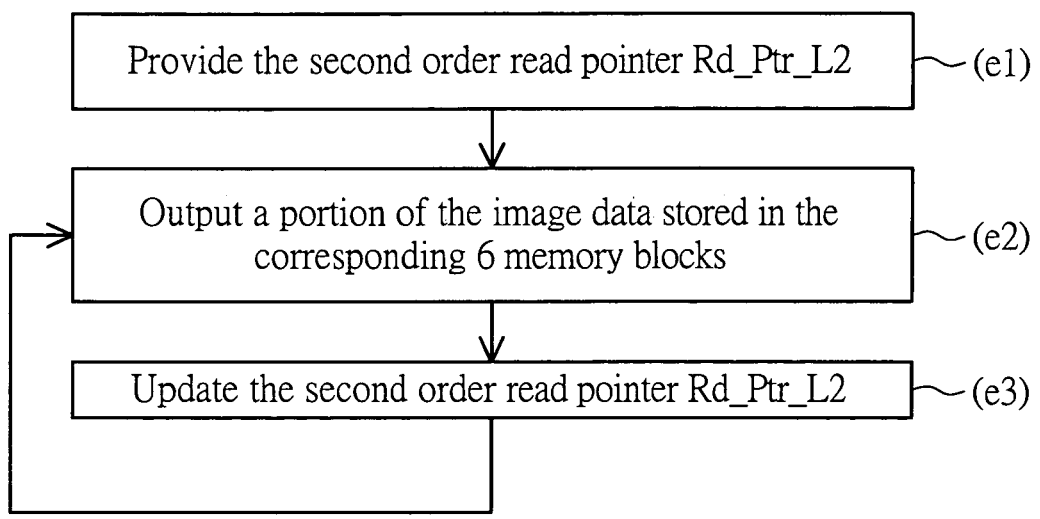
FIG. 7 is a partial flow chart of the data accessing method according to the present embodiment of the invention.

As an example, the step (e) can include steps (e1) to (e3), as shown in FIG. 7. In step (e1), controller 16*b* provides the second order read pointer Rd_Ptr_L2, which points to an address corresponding to a memory unit of each of the M memory blocks. For example, in the read clock cycle Rd_TP1, the second order read pointer Rd_Ptr_L2 points to the $0^{th}$ memory unit of the memory blocks MU0 to MU11.

As shown in step (e2), the controller 16*b* outputs M partial data of the memory blocks MU6 to MU11 according to the second order read pointer Rd_Ptr_L2 in the read clock cycle Rd_TP1. For example, the mini-LVDS interface unit 16 outputs the $0^{th}$ and the $1^{st}$ bit data stored in the $0^{th}$ and the $1^{st}$ memory units of the memory blocks MU6 to MU11 in the read clock cycle Rd_TP1. After that, in step (e3), after the step (e2), the controller 16*b* updates the second order read pointer Rd_Ptr_L2 and repeats the steps (e2) and (e3) until all the bit data stored in the memory blocks MU6 to MU11 are outputted.

For example, in the step (e3), the controller 16*b* updates the second order read pointer Rd_Ptr_L1 to point the $2^{nd}$ memory unit of the memory blocks MU6 to MU11. Then going back to perform the step (e2), the controller 16*b* outputs the $2^{nd}$ and the $3^{rd}$ bit data stored in the $2^{nd}$ and the $3^{rd}$ memory units of the memory blocks MU6 to MU11 in the read clock cycle Rd_TP2. After the step (e3), the controller 16*b* updates the second order read pointer Rd_Ptr_L1 to point the $4^{th}$ memory unit of the memory blocks MU6 to MU11. Then going back to perform the step (e2), the controller 16*b* outputs the $4^{th}$ and the $5^{th}$ bit data stored in the $4^{th}$ and the $5^{th}$ memory units of the memory blocks MU6 to MU11 in the read clock cycle Rd_TP3. As the operation mentioned above, the controller 16*b* repeatedly performs the steps (e2) and (e3) to output the data stored in the memory blocks MU6 to MU11 through the output channels Ch1 to Ch6 sequentially.

The mini-LVDS interface unit of the present embodiment of the invention uses a FIFO buffer to support the data transmission of the mini-LVDS interface, and the step sizes of the write operation and the read operation are set to one memory block. Besides, the second order read pointer is applied to point the memory units in those memory blocks pointed by the first order read pointer. Therefore, the mini-LVDS interface unit and the data accessing method are advantageously capable of reducing the amount of the memory blocks of the buffer applied in the mini-LVDS interface and still capable of supporting the different data output configurations of the mini-LVDS interface.

While the invention has been described by way of example and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for accessing a plurality of image data, comprising:
    a FIFO memory for storing the image data, wherein the image data comprises a plurality of pixel data corresponding to a plurality of pixels respectively, the FIFO memory comprises a plurality of memory blocks, and each of the memory blocks comprises a plurality of memory units; and
    a controller for accessing the FIFO memory in circular manner;
    wherein the controller writes each of the pixel data of the image data into N memory blocks of the FIFO memory on a pixel-basis and reads the stored image data in channel-basis, and the stored image data are respectively read out to a plurality of output channels in a read clock cycle, and within one clock cycle of a read clock signal, the controller reads M bit-pair data of the stored image data from M memory blocks of the plurality of memory blocks of the FIFO memory to M output channels, respectively; the numbers N and M being positive integers greater than 1.

2. The apparatus as claimed in claim 1, wherein the controller writes the image data into the FIFO memory according to a write pointer.

3. The apparatus as claimed in claim 1, wherein the controller reads the stored image data out of the FIFO memory according to a first order read pointer and a second order read pointer.

4. The apparatus as claimed in claim 3, wherein the first order read pointer is for pointing to an address of one of the plurality of memory blocks, and the second order read pointer is for pointing to an address of one of the plurality of memory units.

5. The apparatus as claimed in claim 1, wherein the apparatus is integrated within a timing controller.

6. The apparatus as claimed in claim 1, wherein the controller writes image data of a pixel into the FIFO memory within one clock cycle of a write clock signal.

7. The apparatus as claimed in claim 6, wherein the frequency of the read clock signal is substantially T times of the frequency of the write clock signal, wherein the number T is a half of a bit amount of the image data of the pixel divided by M.

8. The apparatus as claimed in claim 6, wherein the M bit-pair data are read from M different memory blocks of the FIFO memory, respectively.

9. A method for accessing a plurality of image data, comprising the steps of:
  writing the image data into a FIFO memory on a pixel-basis, wherein the image data comprises a plurality of pixel data corresponding to a plurality of pixels respectively, the FIFO memory comprises a plurality of memory blocks, each of the memory blocks comprises a plurality of memory units, and each of the pixel data of the image data are written into N memory blocks of the FIFO memory; and
  reading stored image data out of the FIFO memory in channel-basis, wherein the stored image data are respectively read out to a plurality of output channels in a read clock cycle, and within one clock cycle of a read clock signal, M bit-pair data of the stored image data are read from M memory blocks of the plurality of memory blocks of the FIFO memory to M output channels, respectively; the numbers N and M being positive integers greater than 1;
  wherein the FIFO memory is accessed in circular manner.

10. The method as claimed in claim 9, further comprising the step of providing a write pointer upon which the image data are written into the FIFO memory.

11. The method as claimed in claim 9, further comprising the step of providing a first order read pointer and a second order read pointer upon which the stored image data are read out of the FIFO memory.

12. The method as claimed in claim 11, wherein the first order read pointer is for pointing to an address of one of the plurality of memory blocks, and the second order read pointer is for pointing to an address of one of the plurality of memory units.

13. The method as claimed in claim 12, wherein image data of a pixel are written into the FIFO memory within one clock cycle of a write clock signal.

14. The method as claimed in claim 13, wherein the frequency of the read clock signal is substantially T times the frequency of the write clock signal, wherein the number T is a half of a bit amount of the image data of the pixel divided by M.

15. The method as claimed in claim 13, wherein the step of reading stored image data out of the FIFO memory in channel-basis further comprises:
  outputting M bit-pair data of M successive memory blocks of the FIFO memory through the M output channels respectively according to the address pointed by the first order read pointer, wherein when a number Y+1 is smaller than the number M, data of the last Y+1 memory blocks are read to obtain the first Y+1 data of the M bit-pair data, and data of the first M−(Y+1) memory blocks are read to obtain the last M−(Y+1) data of the M bit-pair data, wherein the number Y is the difference between the address pointed to by the first order read pointer and the address corresponding to the last memory block of the FIFO memory.

16. The method as claimed in claim 13, wherein the M bit-pair data are read from M different memory blocks of the FIFO memory, respectively.

17. The method as claimed in claim 13, wherein the step of writing the image data into the FIFO memory on the pixel-basis further comprises:
  writing N image data of the pixel to N successive memory blocks of the FIFO memory according to a write address pointed by a write pointer, wherein when a number X+1 is smaller than the number N, first X+1 data of the N image data are written to the last X+1 memory blocks of the FIFO memory, and the last N−(X+1) data of the N image data are written to the first N−(X+1) memory blocks of the FIFO memory, wherein the number X is the difference between the write address and the address corresponding to the last memory block of the FIFO memory.

18. The method as claimed in claim 9, wherein the FIFO memory is integrated within a timing controller.

* * * * *